S. DITSON.
CHEESE COVER AND SHOW CASE.
APPLICATION FILED MAY 18, 1908.
899,103.
Patented Sept. 22, 1908.
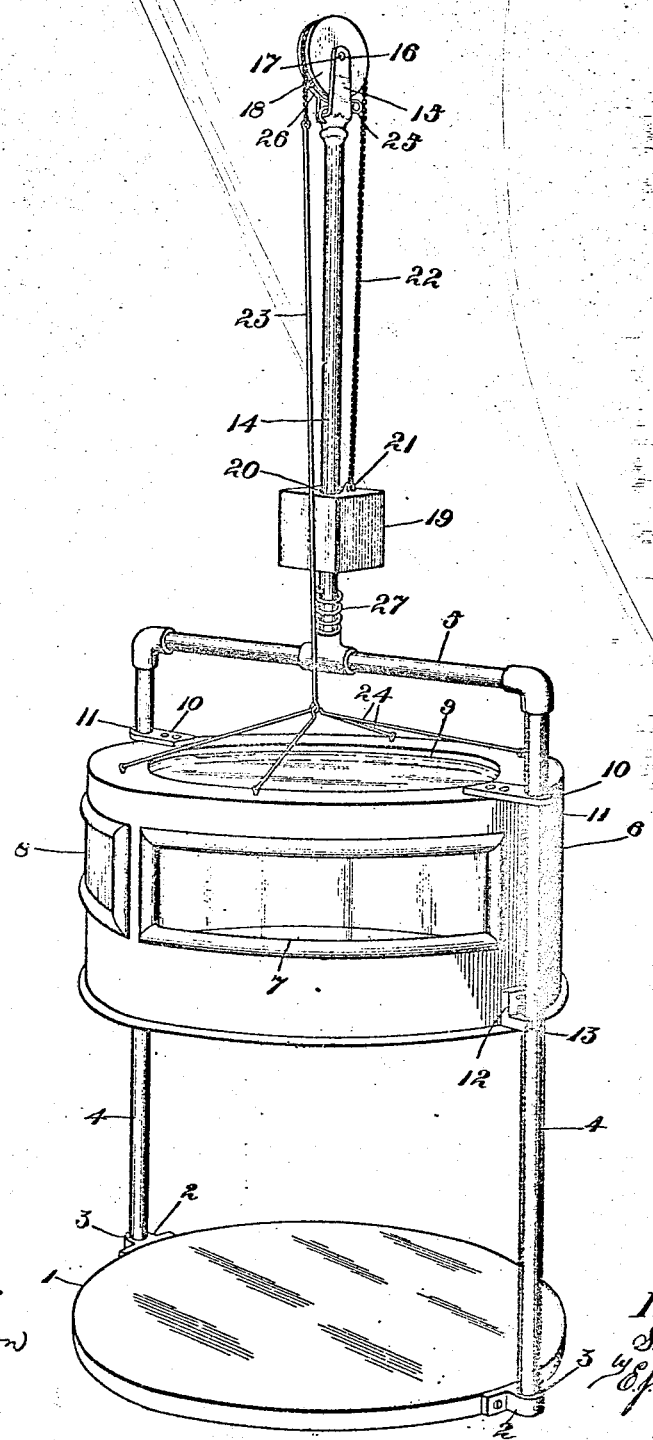
Witnesses
H. Dennison
Wm C. Muir
Inventor
S. Ditson
by E. J. Fitherstonhaugh
Atty.

UNITED STATES PATENT OFFICE.

SAMUEL DITSON, OF COLLINGWOOD, ONTARIO, CANADA.

CHEESE-COVER AND SHOW-CASE.

No. 899,103.      Specification of Letters Patent.      Patented Sept. 22, 1908.

Application filed May 18, 1908. Serial No. 433,534.

*To all whom it may concern:*

Be it known that I, SAMUEL DITSON, a subject of the King of Great Britain, resident of the town of Collingwood, in the county of Simcoe, Province of Ontario, in the Dominion of Canada, have invented certain new and useful Improvements in Cheese-Covers and Show-Cases, of which the following is a specification.

The invention relates to improvements in a combined cheese cover and show-case as described in the following specification and illustrated in the accompanying drawings that form part of the same.

The invention consists essentially in the novel construction and arrangement of parts whereby a vertically slidable cover is held in its upper position by a counter-weight connected therewith.

The objects of the invention are to display the cheese without necessarily uncovering it, to devise a means for removing and replacing the cover and to provide a construction simple and durable and cheap to manufacture.

The drawing represents a perspective view of my device showing the slidable cover portion in a raised position.

Referring to the drawing 1 is the base of the device preferably circular in form and having the brackets 2 secured to the sides thereof and arranged diametrically opposite one to the other, said brackets having the vertical orifices 3 therein.

4 are vertical uprights secured in the orifices 3 in the lugs 2 and joined together at the top by a cross piece 5. The uprights 4 and the cross piece 5 are preferably formed of light tubing, but may be solid rods if so desired.

6 is the cover preferably cylindrical in form and formed of sheet metal, though it may be made of any suitable material or any desired shape. The cover 6 is formed with rectangular openings 7 and 8 in the side wall and a circular opening 9 in the top thereof. The openings 7, 8 and 9 are closed by sheets of glass or other transparent material and secured in said cover in any suitable manner to form an air tight joint therewith so that when the cover is resting on the base 1, all air will be shut off from the cheese, and the said cheese may be seen through the top or side openings, quite readily.

10 are arms rigidly secured to the upper surface of the cover 6 and extending outwardly therefrom and having circular orifices 11 in the outer ends thereof through which the uprights 4 extend.

12 are brackets secured to the side of the cover 6 preferably close to the lower edge and having a jaw shaped projecting portion 13 extending partly around the uprights 6.

It will thus be seen that the cover is secured to the uprights but free to travel up and down thereon and that said cover is held securely in place so that it can only be raised in a vertical position.

14 is a rod fixedly secured to the cross piece 5 and extending vertically upward from the center thereof and having a jaw 15 formed on or secured to its upper extremity, said jaw having the plain orifices 16 through the upper ends thereof.

17 is a pin secured in the orifices 16.

18 is a small grooved wheel or pulley journaled on the pin 17 and arranged between the upwardly extending members of the jaw 15.

19 is a weight having a central circular vertical orifice 20 therethrough and placed on and sliding freely on the upright rod 14, said weight having an eye 21 extending upwardly from its upper surface on one side of said orifice.

22 is a small chain or flexible cord secured in the eye 21 and extending over the grooved pulley 18.

23 is a thin wire rod having an eye at the upper end secured to the chain 22 and an eye on its lower end.

24 are a pair of bails having their ends secured to the top of the cover 6 and their central portion meeting centrally over the top of said cover and secured within the eye at the lower end of the rod 23. Connection is thus established between the weight 19 and the cover 6 so that on the raising or lowering of the cover the weight will travel downwardly and upwardly sliding on the rod 14.

25 is a spring secured in the bottom of the jaw 15 and having a shoe 26 fixedly secured to its outer end engaging the grooved pulley 18 and acting as a brake on said pulley so that any slight variation in weight between the cover 6 and the weight 19 will not have a tendency, if the weight is the heavier, to lift the cover when not desired, but the pressure on the spring held shoe is not sufficient to retard the movement of the weight when the cover is raised in order to gain access to the contents of the case.

27 is a spiral spring encircling the lower end of the rod 14 and acting as a cushion to the weight 16 so that the said weight will not jar unnecessarily if the cover 6 is raised quickly.

The device as herein shown and described is simple and serviceable and will preserve the cheese covered thereby and protect it from the injurious contact of the air and also keep it perfectly clean and fresh, and may be made at a low cost and attractive in appearance.

What I claim as my invention is:—

1. A combined cheese cover and show case, comprising, a base, uprights rigidly secured to said base and extending upwardly therefrom, a cover having arms extending therefrom and engaging said uprights and forming guides, a pulley supported from said uprights, a counter balance weight, a flexible connection extending over said pulley and connecting said cover and said weight, and a brake engaging said pulley.

2. A combined cheese cover and show-case, comprising, a base, a pair of uprights rigidly secured to said base and extending parallelly upwardly therefrom and connected at their upper ends, a rod secured to the connection between said uprights and extending vertically upward therefrom, a pulley rotatably supported at the upper end of said rod, a cover having arms projecting therefrom and engaging said uprights, a weight slidably arranged on said vertical rod, and flexible means connecting said cover and said weight extending over said pulley.

3. A combined cheese cover and show-case, comprising, a base, a pair of uprights rigidly secured to said base and extending parallel upwardly therefrom and connected at their upper ends, a rod secured to the connection between said uprights and extending vertically upward therefrom and having a jaw shaped upper end, a grooved pulley rotatably supported in said jaw, a cover having arms extending therefrom and sliding on said uprights, a weight slidably arranged on said vertical rod, a flexible connection secured at one end to said weight and extending over said grooved pulley and connected at its other end to said slidable cover, a spring held shoe engaging said pulley, and a spring encircling the lower end of said vertical rod and forming a cushion for said weight.

Signed at the town of Collingwood, in the county of Simcoe, Province of Ontario, in the Dominion of Canada this 11 day of May, 1908.

SAMUEL DITSON.

Witnesses:
LOUIS A. DITSON,
M. DITSON.